Jan. 24, 1967  R. L. STARER ETAL  3,300,606
RATE RESPONSIVE PRESSURE CONTROL SYSTEM
Filed Feb. 19, 1965  2 Sheets-Sheet 1
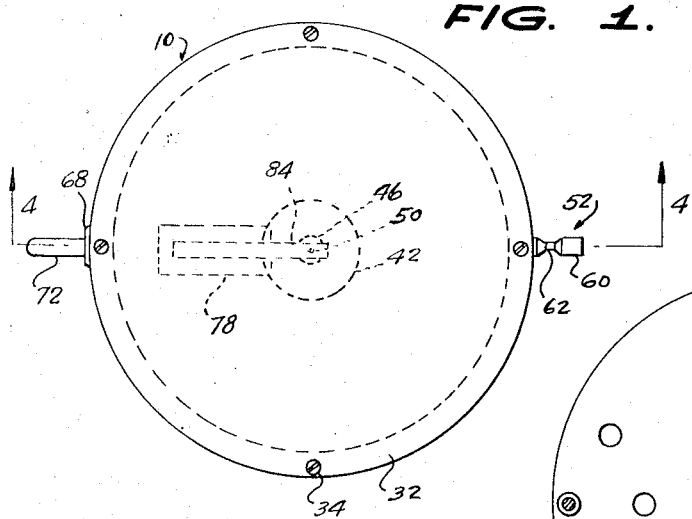
FIG. 1.
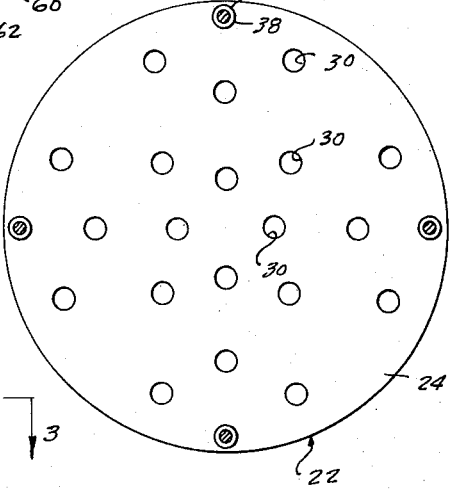
FIG. 3.
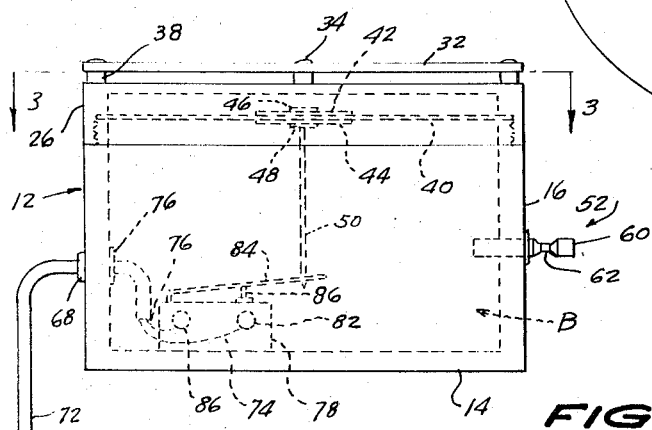
FIG. 2.
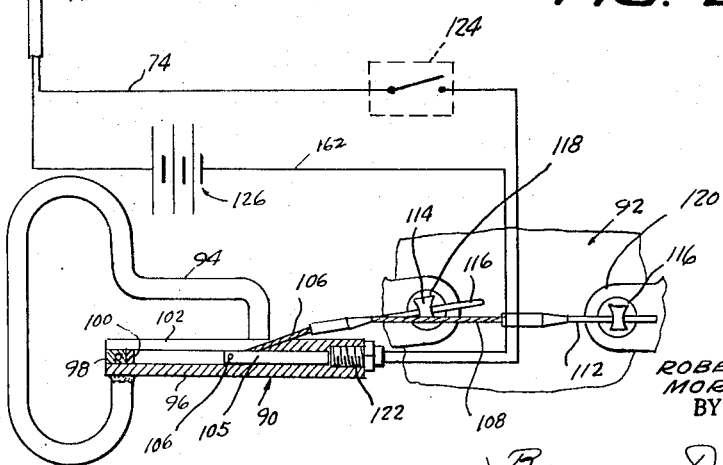
INVENTORS
ROBERT L. STARER,
MORRIS DEAN,
BY
Berman, Davidson & Berman
ATTORNEYS.

Jan. 24, 1967   R. L. STARER ETAL   3,300,606
RATE RESPONSIVE PRESSURE CONTROL SYSTEM
Filed Feb. 19, 1965   2 Sheets-Sheet 2
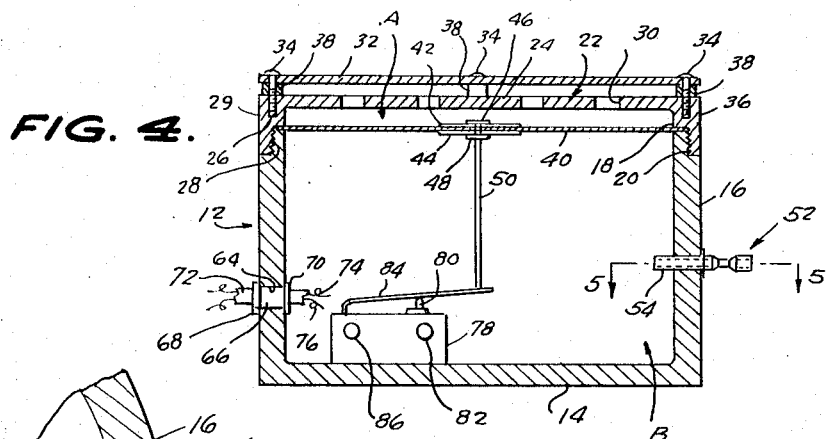
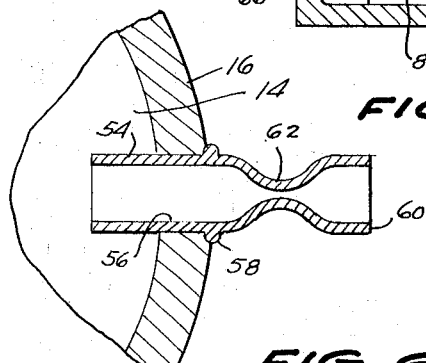
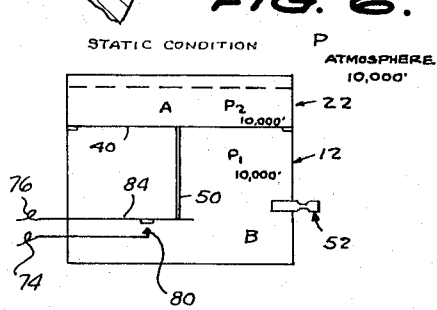
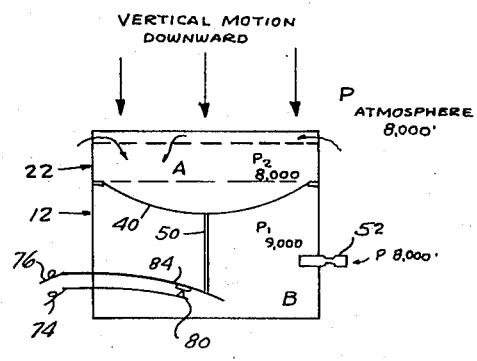
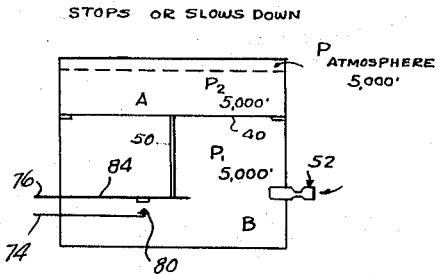
INVENTORS
ROBERT L. STARER,
MORRIS DEAN,
BY
Berman, Davidson & Berman
ATTORNEYS.

United States Patent Office 3,300,606
Patented Jan. 24, 1967

3,300,606
RATE RESPONSIVE PRESSURE
CONTROL SYSTEM
Robert L. Starer, Rydal, Pa., and Morris Dean, Hayward, Calif., assignors to Stephen L. Snyder, Philadelphia, Pa.
Filed Feb. 19, 1965, Ser. No. 433,881
6 Claims. (Cl. 200—83)

This invention relates to the general field of electrical circuit breakers and, more specifically, the instant invention pertains to the provision of a rate responsive control mechanism.

One of the primary objects of this invention is to provide a pressure-operated electrical switch which is adapted for movement through a fluid media in one direction, and wherein the fluid media constantly increases in pressure as the switch is moved in the said one direction, the switch including means sensitive to the rate of change of pressures as the switch passes through the media.

Another object of this invention is to provide a pressure-operated electrical switch adapted for movement through a field of fluid media having a changing pressure in one direction and wherein the switch includes means for sensing the rate of change in pressure as the switch is translated in the aforementioned one direction through said media.

This invention contemplates, as a still further object thereof, the provision of a pressure-operated electrical switch which is responsive to the rate of change of pressures, the switch being non-complex in construction and assembly, inexpensive to manufacture and maintain, and which is durable in use.

Other and further objects and advantages of the instant invention will become more evident from a consideration of the following specification when read in conjunction with the annexed drawings, in which:

FIGURE 1 is a bottom plan view of a rate of change responsive pressure-controlled electrical switch constructed in accordance with this invention;

FIGURE 2 is a side elevational view of the switch shown in FIGURE 1, and illustrating the same operatively connected with detonation means for effecting the operation of the rip cords of a parachute;

FIGURE 3 is a top plan view of the switch shown in FIGURE 1, FIGURE 3 being taken substantially on the horizontal plane of line 3—3 of FIGURE 2, looking in the direction of the arrows;

FIGURE 4 is a detail cross-sectional view taken substantially on the vertical plane of line 4—4 of FIGURE 1, looking in the direction of the arrows;

FIGURE 5 is a fragmentary, enlarged, detail cross-sectional view illustrating the component elements of the bleeder valve as mounted in the sidewall of the switch housing;

FIGURE 6 is a schematic illustration of the component elements of the switch under static air pressure conditions;

FIGURE 7 is a schematic illustration showing the relative positions of the component elements of the switch as the switch is rapidly moved through a fluid or liquid medium from a low pressure field to a high pressure field; and FIGURE 8 is a schematic view illustrating the relative positions of the component elements of the switch as the movement thereof stops or slows in a fluid or liquid medium having a substantially constant pressure.

Referring now more specifically to the drawings, reference numeral 10 designates, in general, a rate responsive pressure-control system for actuating an electrical switch, the control system being constructed in accordance with the teachings of this invention. The system 10 includes a normally vertically-elongated hollow cylindrical housing 12 having a cylindrical bottom wall 14 from the peripheral marginal edge of which rises an integrally-formed substantially cylindrical hollow sidewall or casing 16. The upper end of the sidewall or casing 16 is reduced in diameter to form a neck 18 externally-threaded as at 20 to serve a function to be described.

A substantially hollow cylindrical closure cap is indicated at 22, the cap 22 including a top cylindrical closure wall 24 from the circumferential marginal edge of which depends a substantially hollow cylindrical flange 26. The outer or lower end of the flange 26 is counterbored and is internally-threaded as at 28. The counterbore gives rise, inherently, to a circumferential shoulder 29 as is seen in FIGURES 2 and 4, the closure cap 22 is adapted to be threaded on the upper end of the sidewall or casing 16, the threads 28 threadedly engaging with the threads 20 in such a maner as to draw the shoulder 29 toward the outer end of the neck 18. The top closure wall 24 is provided with a plurality of radially-spaced and circumferentially-spaced transversely-extending diffusing openings 30. Reference numeral 32 connotes a substantially discoidal baffle plate which is detachably connected to the closure cap 22 as by screws 34 which extend transversely therethrough adjacent the circumferential marginal edge thereof at spaced intervals of substantially 90°. The screws 34 are threaded into the flange 26 in tapped openings 36 formed therein to receive the same. Spacer collars 38 are mounted on each screw 34, respectively, intermediate the top closure wall 24 and the discoidal baffle plate 32 to maintain the latter in spaced relationship relative to the former to serve a function to be described infra. The closure wall 24 and discoidal baffle plate 32 comprise means for changing a dynamic flow of air to one having a changing static condition as will become apparent below.

Reference numeral 40 denotes a substantially thin flexible cylindrical diaphragm formed of an air-impervious material, the diaphragm extending transversely across the open upper end of the housing 12, the diaphragm 40 being clamped between the shoulder 29 and the confronting outer end of the neck 18 when the cap 22 is threaded downwardly on the neck 18. As is seen in FIGURES 2 and 4, the diaphragm 40 is disposed proximate to, but spaced below the top closure wall 24.

It will also be seen that the central portion of the diaphragm 40 is embraced between a pair of substantially cylindrical discs 42, 44 and are held clamped against the diaphrgam 40 by means of oppositely-disposed rivet heads 46, 48 carried at the upper end of an elongated cylindrical shank 50. Preferably, the shank 50 is coaxial with respect to the longitudinal axis of the housing 12.

Reference numeral 52 indicates an elongated substantially cylindrical air bleeder valve, in general, as is seen in FIGURES 4 and 5, the air bleeder valve includes an elongated substantially hollow cylindrical tubular end portion 54 which is insertable through a suitable opening 56 formed in the sidewall or casing 16. It will be noted that the tubular end portion 54 extends into the housing 12 for a distance limited only by the external circumferential flange 58. The outer end of the inner tubular end portion 54 continues into an externally-disposed substantially hollow cylindrical tubular outer end portion 60, the latter being reduced in diameter intermediate its ends to form a substantially cylindrical concave-convex restricting throat 62 having the convex side thereof extending inwardly.

Diametrically-opposed with respect to the bleeder valve 52 is an opening 64 which extends transversely through the sidewall or casing 16. Disposed within the opening 64 is a substantially hollow cylindrical bushing 66 which is held against displacement by means of the flanges 68, 70 which engage the sidewall or casing 16 on opposite sides thereof.

Extending through the bushing and into the housing 12 is one end of a flexible cable 72 which carries a pair of electrically-conducting wires 74, 76. Preferably, the cable 72 is air sealed within the bushing 66.

Reference numeral 78 designates a microswitch which is fixedly secured to the bottom wall 14 in any conventional manner. The microswitch 78 includes the fixed switch contact 80 which is internally-connected with a binding post 82. Also mounted on the microswitch 78 is a flexible switch arm 84 which is internally-connected, in turn, with a binding post 86. As is seen in FIGURES 2 and 4, the microswitch 78 is substantially rectangular in configuration and is set on the bottom wall 14 radially with respect to the housing 12 and in such a manner as to position the outer end of the flexible switch arm 84 below the shank 50 and in engagement therewith. The microswitch 78, as is illustrated in FIGURES 2, 4 and 6, is in its normally open position.

That end of the wire 74 disposed within the housing 12 is connected to the binding post 82, and the adjacent end of the wire 76 is connected to the binding post 86.

Referring now more specifically to FIGURE 2 of the drawings, reference numeral 90 designates, in general, an automatic parachute opening device mounted upon a parachute pack 92 which is, for example, of the emergency type used by a sky diver, though obviously, the device 90 may be used in connection with the opening of a main parachute. The parachute opening device 90 may be of the type described and illustrated in Patent No. 3,112,091, which issued on November 26, 1963, to Stephen L. Snyder, and which is entitled, Automatic Parachute-opening Device. Since the device 90 comprises well-known prior art, only a brief reference need be made thereto to demonstrate one utilitarian use for the instant invention.

The device 90 is seen to comprise a conventional rip cord handle 94 for a parachute, the rip cord handle 94 being normally housed within a rip cord handle guard (not shown) of conventional construction. To the handle 94 is fixedly secured the parachute opening device 90 which includes an elongated substantially hollow cylindrical member 96 normally housed within an unmodified conventional rip cord handle guard. The cylindrical member 96 is formed with a closure wall 98 at the outer end thereof, and disposed within the cylindrical member 96 and abutting against the closure wall 98 as a resilient shock absorber pad 100. The cylindrical member 96 is formed with an axially-extending slot which extends inwardly from the closure wall 98 to a point substantially mid-center of the cylindrical member 96.

Mounted for reciprocable movement within the cylindrical member 96 is an elongated substantially cylindrical piston 104, and connected to the inner end of the piston 104 as by a pin 105 are one of the ends, respectively, of a pair of rip cord cables 106, 108. The other ends of the cable 106, 108 are fixedly secured to the inner ends of a pair of parachute securing pins 110, 112, respectively. In their normally operative position, the parachute securing pins 110, 112 are slidably engaged in cones 114, 116, the latter being connected to the parachute 92. In their normal operative position, the parachute securing pins 110, 112 overlie a pair of buckles 118, 120 which surround the cones 114, 116, the buckles being fixedly secured to the cover for the parachute in the usual manner.

The outer end of the piston 104 faces the inner end of a screw plug which is threaded into the other end of the cylindrical member 96. The screw plug 122 comprises a commercially available electrically-ignited and detonating unit which carries an explosive charge (not shown) in confronting relation relative to the outer end of the piston 104. The wires 74, 76, insulated from one another, lead into the outer end of the screw plug 122 and are connected to a primer (not shown) embedded within the explosive charge. All of this is well-known in the art.

Reference numeral 124 designates an aneroid switch of the type described in the above referred to patent to Snyder, No. 3,112,091, the switch 124 being here represented schematically as being of the single-pole, single-throw type.

In actual practice, the switch 124 is maintained in its open position, the altimeter being set to indicate zero altitude at ground level regardless of the atmospheric pressure on a given day. The altimeter is set so as to cause the closing of the switch 124 at a preselected altitude. Means (not shown) are provided for preventing the closing of the switch 124 until the parachutist has reached an altitude above the predetermined altitude. Thereafter, these means are rendered ineffective and the switch is readied to close when the jumper has reached the predetermined altitude.

As is seen in FIGURE 2, the switch 124 is inserted in the wire 74. Reference numeral 126 indicates a conventional battery which has its opposite sides connected in the wire 176. It wil be thus seen that with the microswitch 78 closed, and the aneroid switch 124 moved to its closed position, a series circuit will be established via the primer (which has not been shown), the primer being formed of electrically-conductive material. The establishment of this series circuit cause detonation of the explosive charge within the screw plug 122 which acts against the outer end of the piston 104 causing the same to be driven to the left, as viewed in FIGURE 2, and in so moving, the rip cord cables 106, 108 are moved in the same direction to effect withdrawal of the parachute securing pins 110, 112 from their respective cones 114, 116, thereby freeing the buckles 118, 120. Movement to the left of the piston 104 as shown in FIGURE 2 is arrested when the inner end thereof strikes against the shock absorbing pad 100.

Having described and illustrated the component elements of this invention, the operation of the device 10 in response to the rate of change of pressure during the descent of the parachutist is deemed obvious. However, for the purpose of clarification a brief description thereof is offered below:

Let it be assumed that the microswitch 78 and the arming switch 124 are open and that an airplane carrying the parachuter wearing a parachute 92 equipped with the device 10 has reached an altitude of 10,000 feet and has maintained this altitude for a sufficient time so that the pressure of the ambient atmosphere is equalized in the chamber A, defined by the cap closure wall 24, the flange 26 and the diaphragm 40, with the pressure of the air in chamber B, defined by the diaphragm 40, the sidewall 16, and the bottom wall 14. The chamber A is open to the atmosphere through the openings 30 and the chamber B communicates therewith through the bleeder valve 52. Thus (see FIGURE 6):

$$P_{1_{1000'}} = P_{2_{1000'}}$$

The air pressures in chambers A and B being equal, there is no flexing of the diaphragm 40, and the component elements of the device 10 assume their respective positions under this static condition as shown in FIGURE 6, since the pressure of the air in each chamber A, B is equal.

Now, let is be assumed that the parachutist equipped with the device 10 makes a free fall or jump from an air plane and falls at a given speed to an arbitrary finite altitude of, say, 8,000 feet. The $P_1$ no longer equals $P_2$, for $P_2$ now becomes greater than $P_1$ for the air density in chamber A is now greater than the air density in chamber B. For example, in referring to FIGURE 7, the device 10 having fallen to 8,000 feet, it will be understood that the air at that altitude is freely admitted to the exposed side of the diaphragm so that the pressure $P_{2_{8000'}}$ is substantially equal to the pressure of the ambient atmosphere while, due to the restrictive throat 62 of the air bleeder valve 52, air at 8,000 feet enters the chamber B at a slower rate and hence, the pressure $P_1$ may well be the pressure at, say 9,000 feet or $P_{19000'}$ as indicated in FIGURE 7. Since pressure $P_{19000'}$ is less than $P_{28000'}$ the diaphragm 40 now flexes downwardly and carries the shank 50 downwardly therewith. This causes the microswitch arm 84 to bear downwardly on the fixed switch contact 80 and arming the series circuit described above. The electrical circuit will not be energized, however, until the aneroid switch 124 reaches a previously determined altitude thereby closing the circuit to effect detonation of the explosive charge of the screw plug 122 with the attendant consequences described above. The operation of the switching device 10, is the result of the rate of change of pressure on the diaphgram 40 as the device 10 passes through an air field of constantly increasing pressure, thereby creating a pressure differential on the diaphragm 40 as a consequence of the rate of change of pressure and of such magnitude as is necessary to effect the closing of the microswitch 78.

The device 10 of the instant invention is not to be confused with the conventional differential pressure-operated switches and to that end it is again emphasized that the device or switch 10 is responsive to the rate of change of pressure, and that the operation thereof is related to weigh per unit area, for example, pounds per square inch. To illustrate the distinctive factors which differentiate the instant invention from prior art directed to differential pressure-operated devices the following mathematical explanation is offered wherein:

$P$=Pressure
$P_o$=Pressure at which switch operates
$h$=Altitude
$t$=Time
$\Delta P$=Change in pressure $\frac{\Delta P}{\Delta h}$=Property of atmosphere with respect to P where $h$ equals the altitude $K$=Functional value of bleeder valve (52)

In differential pressure-operated switches $P=P_o-P$ and as long as P remains less than $P_o$ the switch will not operate. However, when P increases to $P_o$ the switch will operate. This is not the basis of the operation of the switch in accordance with the instant invention. In the switch herein disclosed, the same will not operate or function over a pressure range of P through $P_o$ or wherein it becomes greater than $P_o$. This switch operates on the basis that any first derivative of a function may be expressed as $d(f)/dt$ where $(f)$ equals the function and $t$ equals time. Now, in the instant case, the first derivative of P is $$\frac{\Delta P}{t}=\frac{dP}{dt}$$

The instant change of rate responsive switch responds when the finite value of the first derivative of P, that is, $dP/dt$, exceeds K, the value of the rate switch where K is a function of the bleed hole throat restriction 62. Thus, when $dP/dt > K$ the switch will operate, the switch operating in response only to the *rate* at which the pressure level is changing, and not with respect to the finite value $|P|$ as would be differential pressure-operated switch. For example, if $dP$ 10 p.s.i. and $dt=2$ seconds then $$\left|\frac{dP}{dt}\right|=5 \text{ p.s.i./sec.}$$

which is sufficient to operate the switch. Under these circumstances $dP$ can be considered as being $(P_2-P_1)=\Delta P$. In the given example, if $P_1$ is 100 p.s.i. and $P_2$ is 110 p.s.i. then $\Delta P=10$ p.s.i. and the switch will operate. The important operational function of the instant switch is dependent upon the expression $\Delta P/dT$ if $\Delta P$ with respect to time $(t)$ is great enough. Thus, even if $P_1$ is equal to 10 p.s.i. and $P_2$ is equal to 20, P is still equal to 10 p.s.i. and the switch will operate, but if $\Delta P/t$ or $dP/dt$ is $<5$ p.s.i./sec., the switch will not operate. Thus, under no circumstances can the instant invention be related to a differential pressure-operated switch.

Of further interest in connection with this invention it should be noted that should the switch 124 be inadvertently closed before the airplane reaches the desired altitude, the device 10 would not operate to close the electric circuit so as to set off the explosive charge since the $P_1$ in chamber B is greater than the pressure $P_2$ in chamber A whereby the diaphragm 40 would tend to flex upwardly and move the shank 50 in a direction away from the switch arm 84, thereby preventing the closing of the microswitch 78. In this sense, the device 10 may be considered as serving in the capacity of a safety switch since the series circuit can only be energized if both the microswitch 78 and the arming switch 124 are in their respective closed positions.

Should the device 10 slow down in acceleration or actually comes to a stop at, say, 5000' and remains a sufficient length of time at or about this altitude, air at $P_{5000'}$ will enter the chamber B to bring $P_{15000'}$ to the same value. $P_{25000'}$ is, of course, at the same value as $P_{5000'}$. Thus, $P_{15000'}$ is equal to $P_{25000'}$ and the diaphragm 40 will now flex toward its original full-line position shown in FIGURE 4. In so moving, the shank 50 is moved upwardly thereby permitting the flexible switch arm 84 to move upwardly therewith to open the fixed switch contact 80 and thereby restores the device 10 to its original inoperative condition, the component elements of the device assuming the position shown in FIGURE 8.

The discoidal baffle plate 32 is employed in conjunction with the device 10 as a ram air deflector or baffle, the plate 32 preventing any ram or dynamic air pressure from effecting displacement of diaphragm 40.

The device 10 according to this invention may also be used in many other ways. For example, the device 10 may be utilized in the arming of fusing systems for bombs when it is considered unsafe to arm them manually in the aircraft. The device 10 could also be used independently of any barometric electric automatic parachute opening systems when used in conjunction with troop-type or static jumps where the jumper's vertical velocity is limited by the static line deploying the main chute immediately. However, this switch device 10 would actuate the auxiliary chute when the parachutist attains a greater vertical velocity than normal, due, for example, to a malfunction of the main chute. It is also contemplated that the device 10 could be used to actuate electrical systems in spacecraft upon re-entry into the atmosphere from outer space.

Having described one embodiment of this invention in detail, it will be understood that the same is offered merely by way of example, and that this invention is to be limited only by the scope of the appended claims.

What is claimed is:

1. A rate-responsive pressure-control system operable in response to the translation of said system in a fluid media having a pressure constantly varying in one direction, said system comprising a substantially hollow housing having an open end, a flexible diaphragm fixedly-secured to said housing and extending transversely across said open end to establish a closed chamber in said housing, bleeder valve means on said housing including a transversely-extending opening having ends of which one end opens directly into said chamber and another end thereof opens externally of said housing and directly into said fluid media at one side of said diaphragm, means for converting a dynamic pressure flow of said fluid media as such system is translated therethrough to one of a changing static condition comprising an impervious baffle plate and a closure wall, said baffle plate being fixedly-secured on said housing at said one end thereof, said baffle plate being proximate to and extending transversely of said diaphragm in spaced relation relative thereto and at that side thereof remotely-located with respect to said bleeder valve means, said closure wall extending transversely across said open end of said housing intermediate said baffle plate and said diaphragm and in spaced relation relative to each of the latter, said closure wall having a plurality of openings extending transversely therethrough the total area of which is greater than the transverse cross-sectional area of said bleeder valve opening, and work-effecting means connected on said diaphragm and movable therewith as said diaphragm is deflected while said system is translated through said fluid media.

2. A rate-responsive pressure-control system as defined in claim 1, and fluid media flow-restricting means disposed in said bleeder valve opening.

3. A rate-responsive pressure-control system as defined in claim 1, and means in said housing connected with and being operable by said work-effecting means.

4. A rate-responsive pressure-control system as defined in claim 3 wherein said last-named means is disposed within said chamber and is secured to said housing.

5. A rate-responsive pressure-control system as defined in claim 4 wherein said last-named means comprises switch means and control means therefor, and said work-effecting means is operably-connected on said control means.

6. A rate-responsive pressure-control system as defined in claim 5 wherein said switch means comprises an electrical switch for connection in an electrical circuit, and said control means comprises a switch arm.

References Cited by the Examiner

UNITED STATES PATENTS

| | | | |
|---|---|---|---|
| 3,029,633 | 4/1962 | Bauer et al. | 73—406 X |
| 3,093,716 | 6/1963 | Horowitz | 200—83 |
| 3,104,614 | 9/1963 | Gramenizi | 200—83 X |

BERNARD A. GILHEANY, *Primary Examiner.*

G. MAIER, *Assistant Examiner.*